US009947116B2

(12) United States Patent
Matthews

(10) Patent No.: US 9,947,116 B2
(45) Date of Patent: Apr. 17, 2018

(54) METHODS AND SYSTEMS FOR DETECTOR GAP CORRECTIONS

(71) Applicant: General Electric Company, Schenectady, NY (US)

(72) Inventor: Christopher Gerald Matthews, Nashotah, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/658,066

(22) Filed: Mar. 13, 2015

(65) Prior Publication Data

US 2016/0267687 A1    Sep. 15, 2016

(51) Int. Cl.
*G06T 11/00* (2006.01)
*G01T 1/202* (2006.01)
*G01T 1/29* (2006.01)
*G01T 1/164* (2006.01)

(52) U.S. Cl.
CPC .......... *G06T 11/003* (2013.01); *G01T 1/1647* (2013.01); *G01T 1/202* (2013.01); *G01T 1/2985* (2013.01)

(58) Field of Classification Search
CPC .................................................... G06T 11/003
See application file for complete search history.

(56) References Cited

U.S. PATENT DOCUMENTS

| 4,016,606 | A | 4/1977 | Murray et al. |
| 6,126,692 | A | 10/2000 | Robie et al. |
| 2005/0109943 | A1* | 5/2005 | Vaquero ............... G01T 1/1644 250/363.04 |

FOREIGN PATENT DOCUMENTS

| EP | 0809986 A2 | 12/1997 |
| EP | 0978261 A1 | 2/2000 |
| FR | 2712178 A1 | 5/1995 |
| WO | 2004069105 A1 | 8/2004 |

OTHER PUBLICATIONS

Bjarne Stroustrup, "An Overview of C++", AT&T Bell Laboratories, OOPWORK '86 Proceedings of the 1986 SIGPLAN workshop on Object-oriented programming pp. 7-18, 1986.*
Van Velden, F. et al., "Gap Filling Strategies for 3-D-FBP Reconstructions of High-Resolution Research Tomograph Scans," IEEE Transactions on Medical Imaging, vol. 27, No. 7, Jul. 2008, 9 pages.

(Continued)

*Primary Examiner* — Edwin Gunberg
(74) *Attorney, Agent, or Firm* — McCoy Russell LLP

(57) ABSTRACT

Methods and systems are provided for correcting positional errors in an image arising from gaps in a detector assembly. In one embodiment, a method comprises generating a sinogram based on a plurality of photon coincidence events, selectively inserting one or more pseudo-slices into the sinogram, and generating an image based on the sinogram including the one or more pseudo-slices. In this way, positional errors may be reduced without modifying an image reconstruction algorithm to include a full detector geometry or modifying the detector geometry itself.

19 Claims, 9 Drawing Sheets

(56) References Cited

OTHER PUBLICATIONS

Tuna, U. et al., "Interpolation for the Gap-Filling of the HRRT PET Sinograms by Using the Slices in the Direction of the Radial Samples," 2009 IEEE Nuclear Science Symposium Conference Record, Oct. 2009, 7 pages.

Tuna, U. et al., "Gap-Filling for the High-Resolution PET Sinograms With a Dedicated DCT-Domain Filter," IEEE Transactions on Medical Imaging, vol. 29, No. 3, Mar. 2010, 10 pages.

Loukiala, A. et al., "Gap-Filling Methods for 3D PlanTIS Data," Physics in Medicine and Biology, vol. 55, No. 20, Sep. 2010, 15 pages.

Ahn, S. et al., "Gap Compensation During PET Image Reconstruction by Constrained, Total Variation Minimization," Medical Physics, vol. 39, No. 2, Feb. 2012, 14 pages.

Kastis, G. et al., "Evaluation of the Spline Reconstruction Technique for PET," Medical Physics, vol. 41, No. 4, Apr. 2014, Preprint Submitted Dated Jan. 2014, 39 pages.

Tuna, U. et al., "Evaluation of Analytical Reconstruction with a New Gap-Filling Method in Comparison to Iterative Reconstruction in [11C]-Raclopride Pet Studies," Annals of Nuclear Medicine, vol. 28, No. 5, Jun. 2014, Available Online Mar. 2014, 13 pages.

Defrise, M. et al., "Exact and Approximate Rebinning Algorithms for 3-D PET Data," IEEE Transactions on Medical Imaging, vol. 16, No. 2, Apr. 1997, 14 pages.

\* cited by examiner

METHODS AND SYSTEMS FOR DETECTOR GAP CORRECTIONS

FIELD

Embodiments of the subject matter disclosed herein relate to non-invasive diagnostic imaging, and more particularly, to image reconstruction using Positron Emission Tomography (PET).

BACKGROUND

PET generates images that represent the distribution of positron-emitting nuclides within the body of a patient. When a positron interacts with an electron by annihilation, the entire mass of a positron-electron pair is converted into two 511-keV photons. The photons are emitted in opposite directions along a line of response (LOR). The annihilation photons are detected by detectors that are placed on both sides of the line of response, in a configuration such as a detector ring. Coincidence occurs when these photons arrive and are detected at the detector elements at the same time. An image is then generated based on the acquired image data that includes the annihilation photon detection information.

Modern PET scanners include a plurality of detector rings coaxially arranged into a plurality of detector blocks. For this configuration, two detectors associated with an LOR are not necessarily within the same detector ring, but may be located within different detector rings. Such scanners increase workflow throughput, improve image quality, and enable a lower dose and scan time. However, each of the detector blocks may be separated by a small gap, which in turn results in a corresponding gap between some of the image slices. If image reconstruction does not account for these gaps, positioning errors arising from these gaps may propagate through the image reconstruction and subsequent image stitching processes. For example, modern PET scanners are typically further equipped with a computed tomography (CT) scanner to enable PET/CT imaging. Assuming the CT imaging perfectly images the body of a patient without positioning errors, substantial mis-registration errors may occur when stitching the CT image and the PET image together. That is, objects in the final PET/CT image may be incorrectly positioned within the image. As another example, for PET-PET stitching, a single point source which in adjacent frames is imaged in opposite ends of the FOV may be broadened into two point sources in the final stitched image.

One solution may involve eliminating the gaps between detector blocks. However, eliminating the gaps would require a substantial redesign of the imaging system itself. Another solution may involve accounting for full detector geometry in the reconstruction process. However, current methods for image reconstruction utilize symmetries of the detector geometry. Accounting for the gap breaks at least some of the symmetries, and as a result substantially slows down the reconstruction time. Methods and systems for correcting errors arising from detector gaps without sacrificing the computational efficiencies based on symmetries of the detector geometry are desirable.

BRIEF DESCRIPTION

In one embodiment, a method comprises generating a sinogram based on a plurality of photon coincidence events, selectively inserting one or more pseudo-slices into the sinogram, and generating an image based on the sinogram including the one or more pseudo-slices. In this way, positional errors may be reduced without modifying an image reconstruction algorithm to include a full detector geometry or modifying the detector geometry itself.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 3:
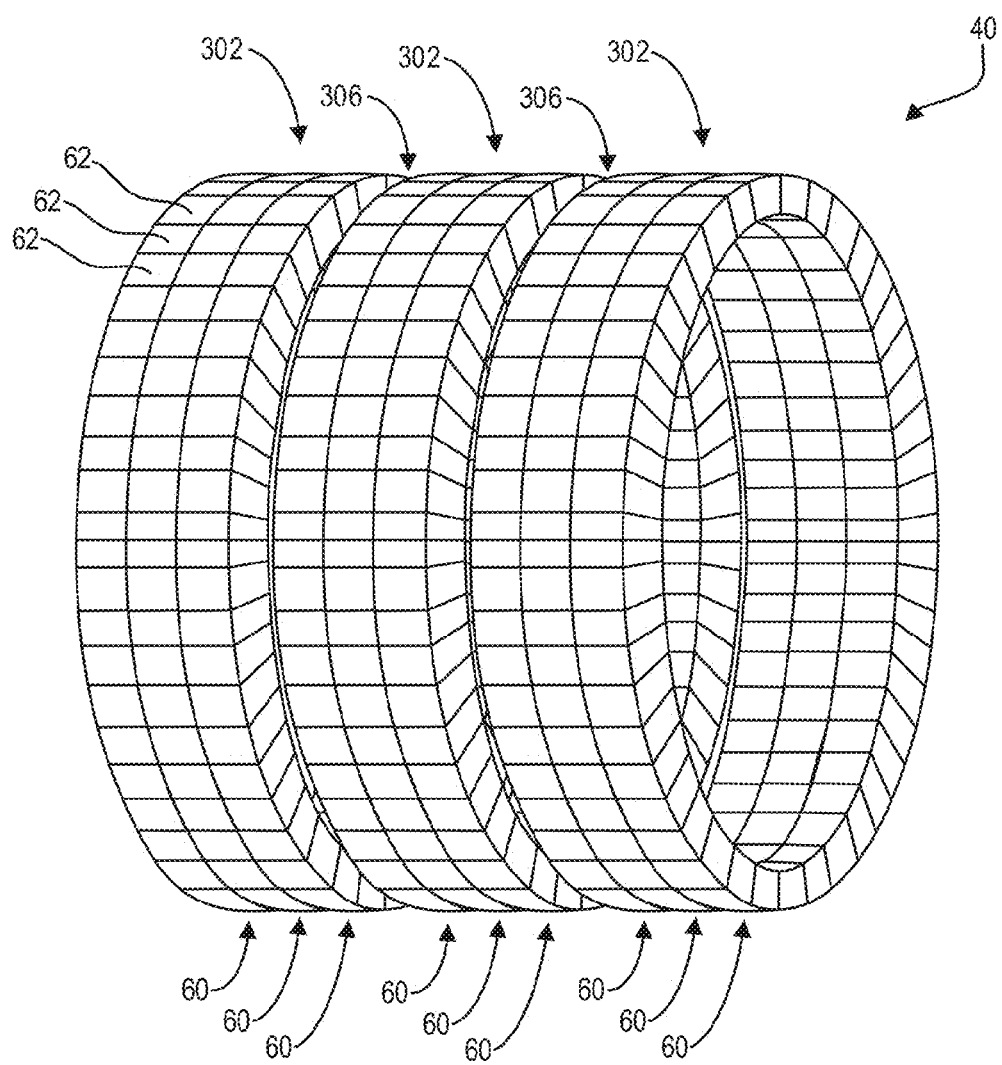
FIG. 3 is a perspective view of an exemplary detector ring assembly according to an embodiment of the invention.
Figure 4:
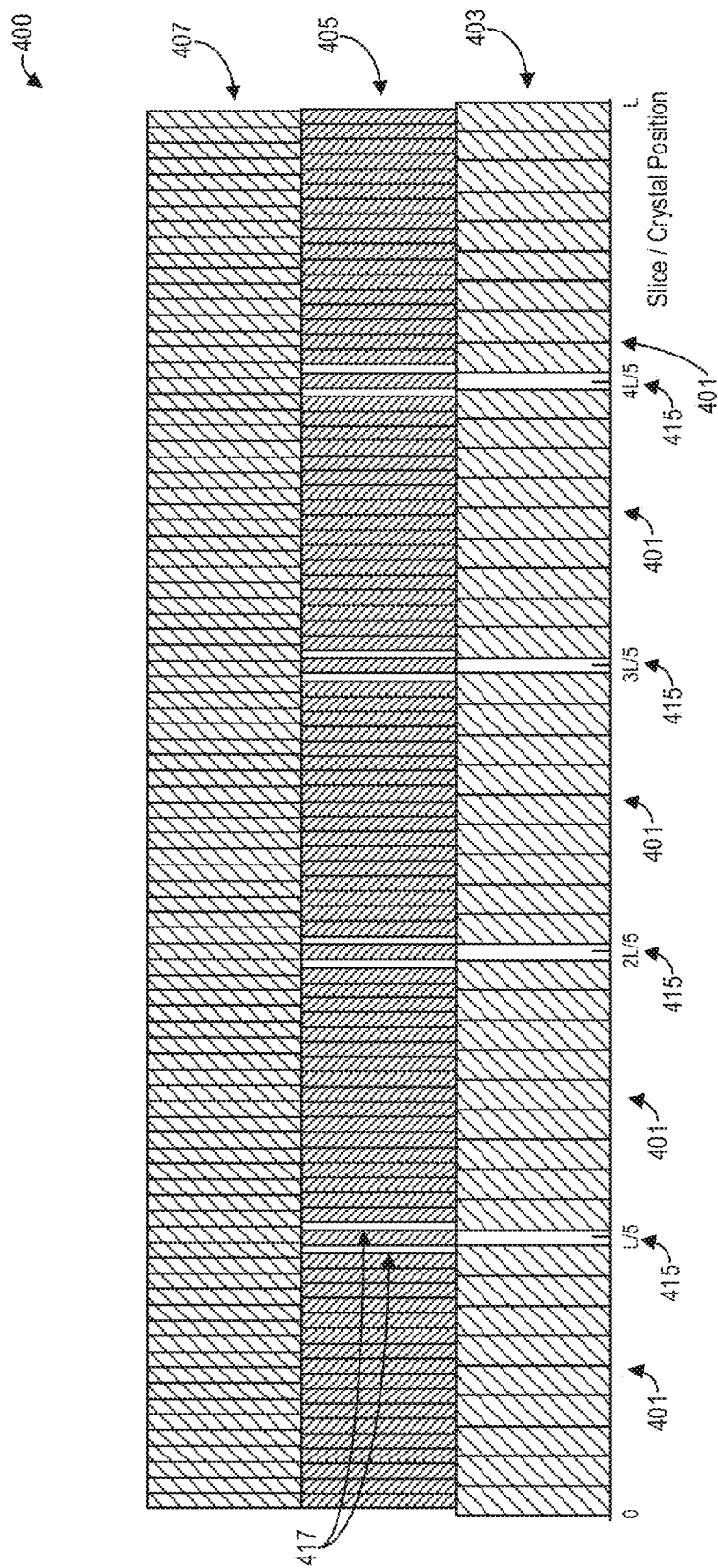
FIG. 4 is a diagram illustrating example axial positioning errors.
Figure 5:
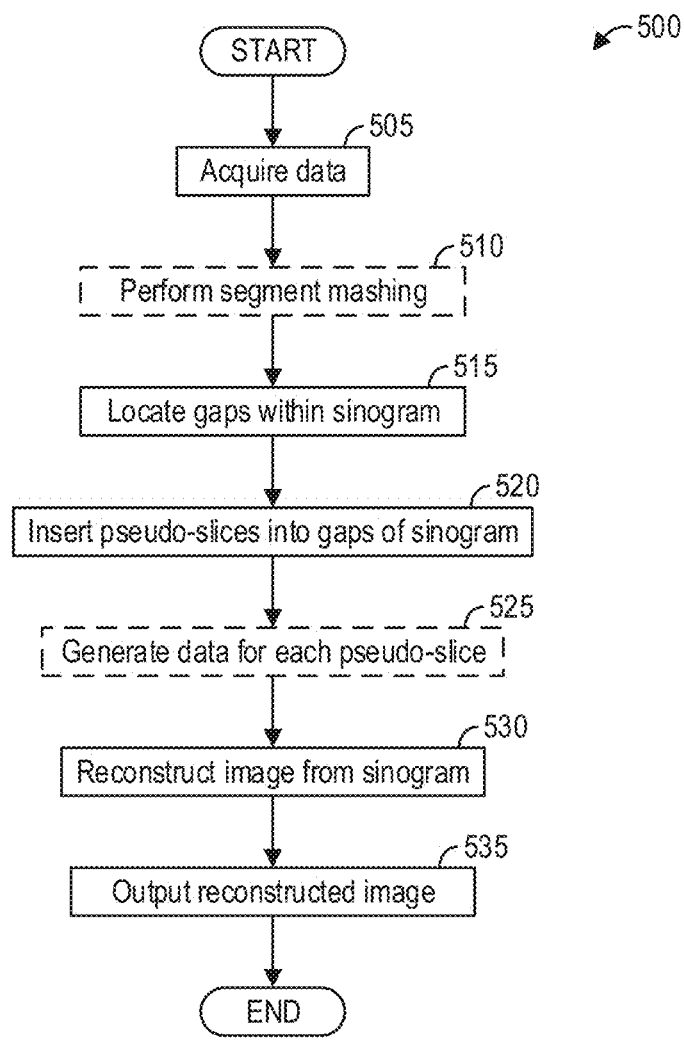
FIG. 5 is a high-level flow chart illustrating an example method for correcting positioning errors according to an embodiment of the invention.
Figure 8:
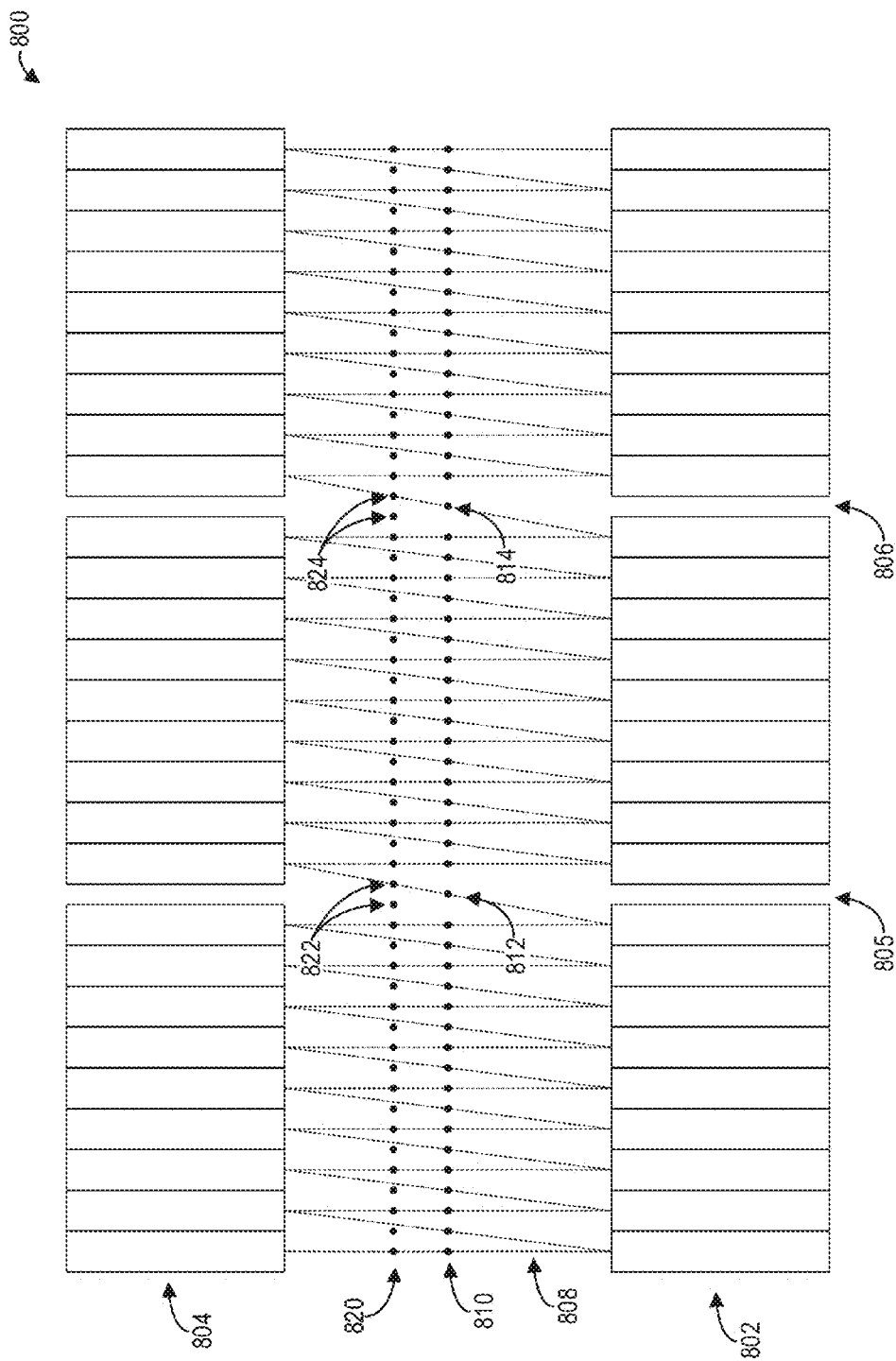
FIG. 8 is a diagram illustrating an example insertion of pseudo-slices into an imaging data of segment number zero according to an embodiment of the invention.
Figure 9:
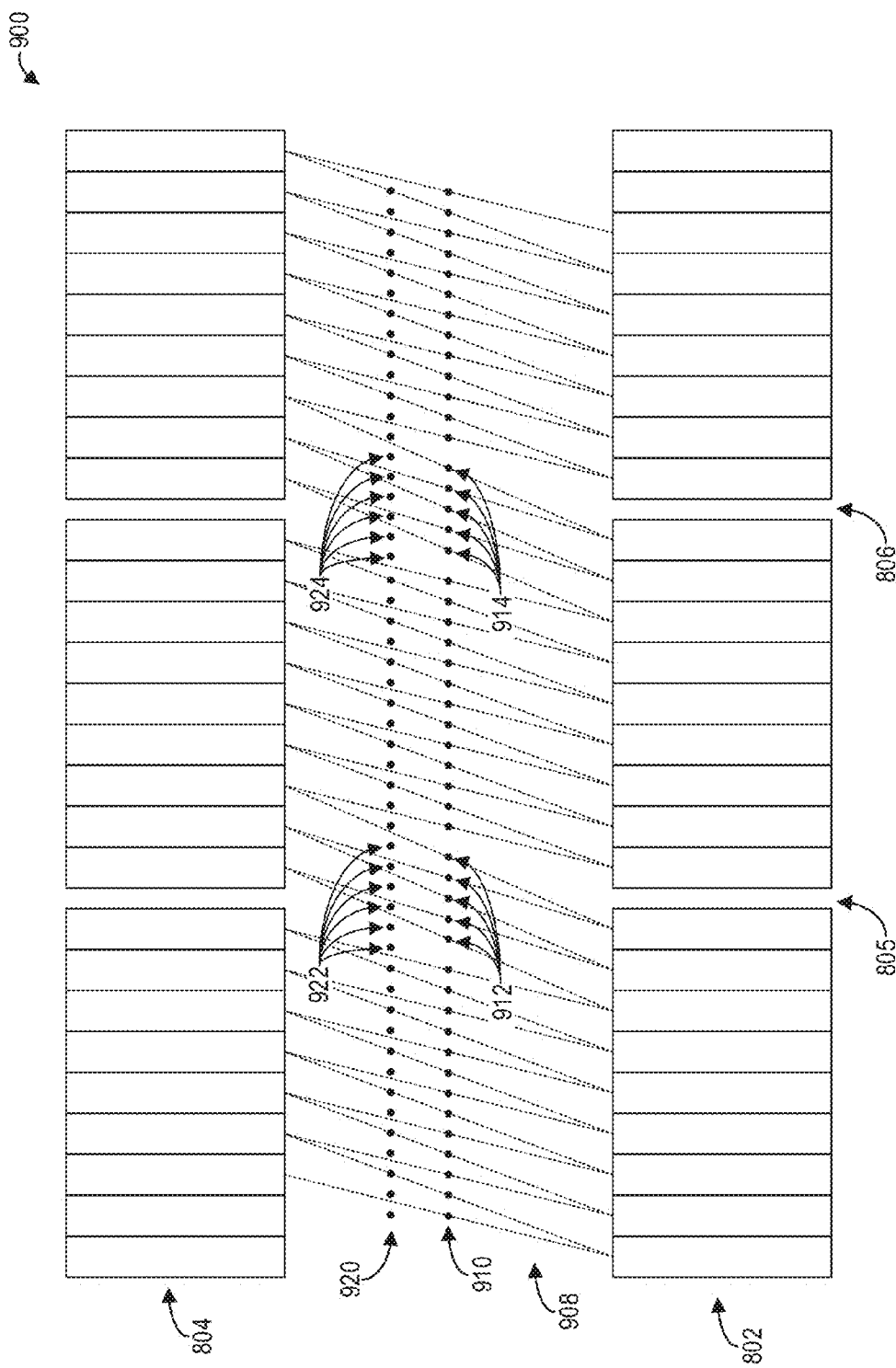
FIG. 9 is a diagram illustrating an example insertion of pseudo-slices into imaging data of segment number one according to an embodiment of the invention.

The following description relates to various embodiments of medical imaging systems. In particular, methods and systems are provided for correcting positional errors arising from gaps in a detector assembly. An example of a positron emission tomography (PET) imaging system that may be used to acquire images processed in accordance with the present techniques is provided in FIGS. 1 and 2. As depicted in FIG. 3, the positions of the detectors in the axial direction may not be uniformly spaced. For example, gaps may be present between detector blocks. These gaps cause shifts in the positions of the reconstructed images unless accounted for by the reconstruction algorithm, as depicted in FIG. 4. A method for compensating for the gaps includes inserting pseudo-slices into gaps within a sinogram, as depicted in FIG. 5. In some examples, the sinogram may be transformed from a first data structure, such as the data structure illustrated in FIG. 6, into a second data structure, such as the data structure illustrated in FIG. 7. Such a data transformation may simplify the insertion of pseudo-slices into the sinogram. FIGS. 8 and 9 include illustrations of the insertion of pseudo-slices into a sinogram based on the second data structure.

Though a PET imaging system is described by way of example, it should be understood that the present techniques may also be useful when applied to images acquired using other imaging modalities, such as CT, tomosynthesis, MRI, C-arm angiography, and so forth. The present discussion of a PET imaging modality is provided merely as an example of one suitable imaging modality.

As used herein, the phrase "reconstructing an image" is not intended to exclude embodiments of the present invention in which data representing an image is generated but a viewable image is not. Therefore, as used herein the term "image" broadly refers to both viewable images and data representing a viewable image. However, many embodiments generate, or are configured to generate, at least one viewable image.

Figure 1:
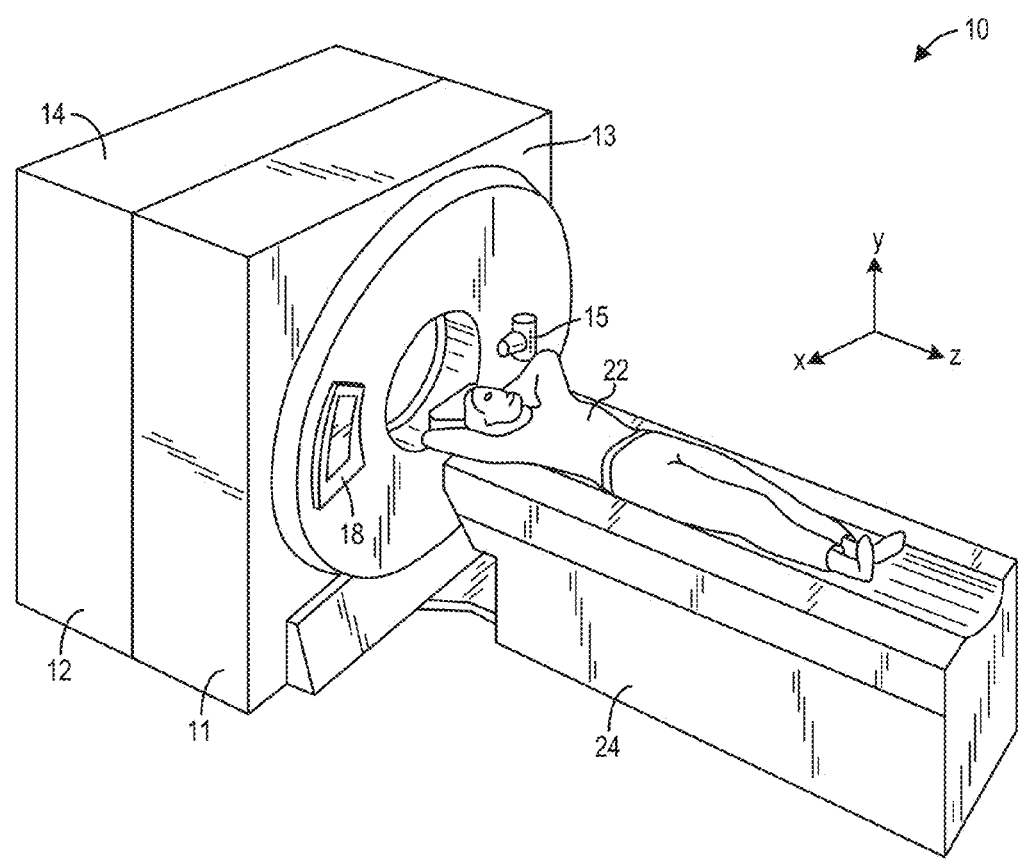
FIG. 1 is a pictorial view of an exemplary multi-modality imaging system according to an embodiment of the invention.
Figure 2:
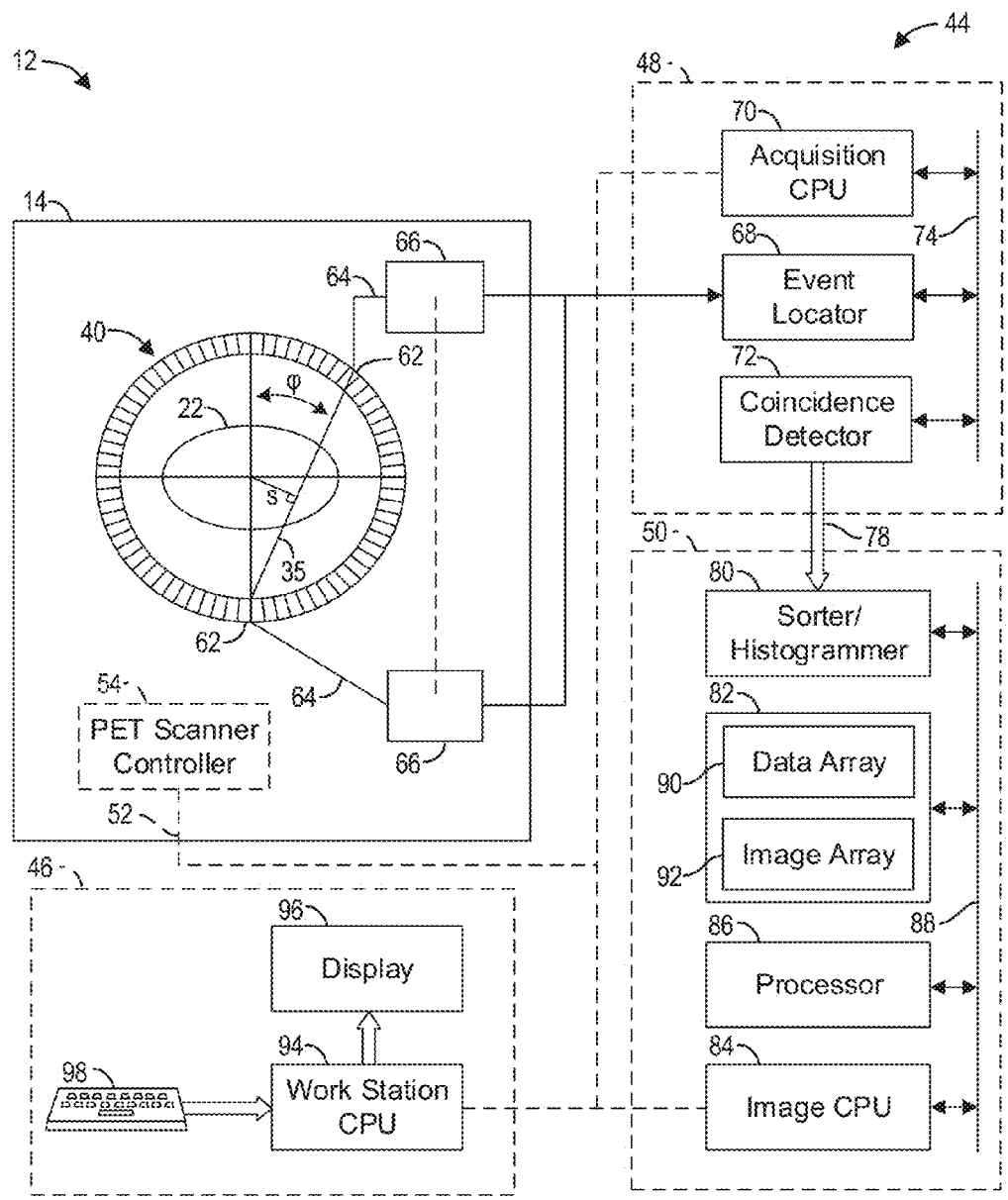
FIG. 2 is a block schematic diagram of an exemplary imaging system according to an embodiment of the invention.

Various embodiments of the invention provide a multi-modality imaging system 10 as shown in FIGS. 1 and 2. Multi-modality imaging system 10 may be any type of imaging system, for example, different types of medical imaging systems, such as a Positron Emission Tomography (PET, a Single Photon Emission Computed Tomography (SPECT), a Computed Tomography (CT, an ultrasound system, Magnetic Resonance Imaging (MRI), or any other system capable of generating tomographic images. The various embodiments are not limited to multi-modality medical imaging systems, but may be used on a single modality medical imaging system such as a stand-alone PET imaging system or a stand-alone SPECT imaging system, for example. Moreover, the various embodiments are not limited to medical imaging systems for imaging human subjects, but may include veterinary or non-medical systems for imaging non-human objects.

Referring to FIG. 1, the multi-modality imaging system 10 includes a first modality unit 11 and a second modality unit 12. The two modality units enable the multi-modality imaging system 10 to scan an object or patient in a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system 10, e.g., the first modality 11 is a CT imaging system 11 and the second modality 12 is a PET imaging system 12. The CT/PET system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the PET imaging system 12 illustrated in FIG. 1 in accordance with an embodiment of the present invention. The PET imaging system 12 includes a detector ring assembly 40 including a plurality of detector crystals. The PET imaging system 12 also includes a controller or processor 44, to control normalization and image reconstruction processes. Controller 44 is coupled to an operator workstation 46. Controller 44 includes a data acquisition processor 48 and an image reconstruction processor 50, which are interconnected via a communication link 52. PET imaging system 12 acquires scan data and transmits the data to data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system 12. The PET scanner controller 54 responds to the commands received from the operator workstation 46 through the communication link 52. Therefore, the scanning operation is controlled from the operator workstation 46 through PET scanner controller 54.

FIG. 3 is a perspective view of the exemplary detector ring assembly 40 (shown in FIG. 2). The detector ring assembly 40 includes a plurality of detector blocks 302. For simplicity, only three detector blocks 302 are depicted, however it should be understood that the depicted quantity of detector blocks 302 is exemplary, and that the methods described herein may be applied to any exemplary detector ring assembly having N individual detector blocks 302, where N is greater than or equal to 2. For example, in one embodiment, the detector ring assembly 40 may include three detector blocks 302, while in other embodiments the detector ring assembly 40 may include a number of detector blocks 302 greater than or less than three. Each detector block 302 includes a plurality of detector rings 60. For simplicity, only three detector rings 60 are depicted in each detector block 302, however it should be realized that the depicted quantity of detector rings 60 is exemplary only, and that the methods described herein may be applied to any exemplary detector ring assembly having R individual detector rings 60, where R is greater than or equal to 2. For example, in one embodiment, the detector ring assembly 40 may include nine detector rings 60, while in other embodiments, the detector ring assembly 40 may include a number of detector rings 60 greater than or less than nine. Each detector ring 60 also includes P detector elements or scintillator crystals 62. It should be realized that the quantity of scintillator crystals 62 is exemplary only, and that the methods described herein may be applied to any exemplary detector ring 60 having N individual scintillator crystals 62, wherein P is greater than or equal to 2. In one embodiment, each detector ring 60 may include 568 individual scintillator crystals 62, while in other embodiments, each detector ring 60 may include more or less individual scintillator crystals.

In one embodiment, a gap 306 may be located between each detector block 302. As described further herein, such a gap 306 causes one or more corresponding gaps in physical slice locations. Typical image reconstruction processes do not account for such gaps, thereby resulting in incorrect image slice positions. As described further herein, the gaps in physical slice locations may be filled with pseudo-slices. In this way, the gaps 306 may be accounted for during image reconstruction.

Referring again to FIG. 2, during operation, when a photon collides with a crystal 62 on a detector ring 60, it produces a scintillation on the crystal. Each photomultiplier tube produces an analog signal that is transmitted on communication line 64 when a scintillation event occurs. A set of acquisition circuits 66 is provided to receive these analog signals. Acquisition circuits 66 produce digital signals indicating the three-dimensional (3D) location and total energy of the event. The acquisition circuits 66 also produce an event detection pulse, which indicates the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet must be within a predetermined time period, for example, 12.5 nanoseconds, of each other. Second, the line-of-response (LOR) formed by a straight line joining the two detectors that detect the coincidence event should pass through the field of view in the PET imaging system 12. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a unique pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. Resulting image arrays 92 are then stored in memory module 82.

The images stored in the image array 92 are communicated by the image CPU 84 to the operator workstation 46. The operator workstation 46 includes a CPU 94, a display 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system 12 and the positioning of the patient 22 for a scan. Similarly, the operator can control the display of the resulting image on the display 96 and can perform image-enhancement functions using programs executed by the workstation CPU 94.

FIG. 4 is a diagram 400 illustrating example axial positioning errors. In particular, diagram 400 illustrates how gaps 415 between detector blocks 401 may result in corresponding gaps 417 between physical slice positions 405. As described further herein, if the gaps 417 are not accounted for, substantial positioning errors for image slice positions 407 may occur.

In the depicted embodiment, each detector block 401 includes nine detector rings, each detector ring represented by exemplary detector crystals 403. In the depicted embodiment, the full detector ring assembly may extend a length L in the axial direction. The length L of the detector ring assembly may, as a non-limiting example, be 250 mm, however in other examples the length L may be greater than or less than 250 mm. Furthermore, the detector ring assembly may include five detector blocks 401 as depicted, however in some examples the detector ring assembly may include a number of detector blocks 401 greater than or less than five.

Each detector block 401 is separated by a gap 415. For example, in the depicted embodiment, gaps 415 are located at axial positions L/5, 2L/5, 3L/5, and 4L/5.

A three-dimensional tomographic image may be generated from a plurality of image slices, where each image slice is generated based on imaging data acquired by the detector crystals 403. Typically, for PET imaging, slice thickness and slice separation is half the crystal spacing. In this way, counting from the left, the first physical slice position 405 is centered on the center of the first detector crystal 403, the second physical slice position 405 is centered on the boundary between the first detector crystal 403 and the second detector crystal 403, the third physical slice position 405 is centered on the center of the second detector crystal 403, and so on for the first seventeen image slices 405 and the first nine detector crystals 403. The gap 415 at axial position L/5 after the first nine detector crystals 403 causes a gap 417 in image space where imaging data is not acquired (i.e., due to the absence of a detector crystal at the location of the gap 415). Specifically, the eighteenth image slice 405 is sandwiched between two gaps 417, where the total width of the two small gaps 417 equals the width of a gap. The eighteenth image slice 405 is centered on the first gap 415 and comprises imaging data based on oblique LORs which cross the gap 415 from the first detector block 401 to one of the other four detector blocks 401. The physical positions of the next seventeen image slices 405 align as described above with the detector crystals 403 of the second detector block 401, the second gap 415 causes a corresponding gap in the physical positions of image slices 405, and so on.

Positioning errors occur when the gaps 417 are not accounted for while generating the full three-dimensional image from the image slices 405. In particular, for typical PET imaging, the image slice positions 407 are assumed to be uniformly spaced, and so the gaps 415 and 417 are not included. As described further herein with regard to FIG. 5, a method may include inserting pseudo-slices in order to compensate for the gaps 417 between the physical positions of image slices 405.

FIG. 5 shows a high-level flow chart illustrating an example method 500 for eliminating gaps in image space according to an embodiment. In particular, method 500 relates to the insertion of pseudo-slices to account for gaps in image space. Method 500 may be carried out using the systems and components described herein above with regard to FIGS. 1-3, for example the method may be stored as executable instructions in non-transitory memory 82 and executed by processor 86. However, it should be understood that the method may be carried out using different systems and components without departing from the scope of the disclosure.

Method 500 may begin at 505. At 505, method 500 may include acquiring data. Acquiring data may comprise, for example, detecting photon coincidence events and sorting the photon coincidence events into a data array 90.

Figure 6:
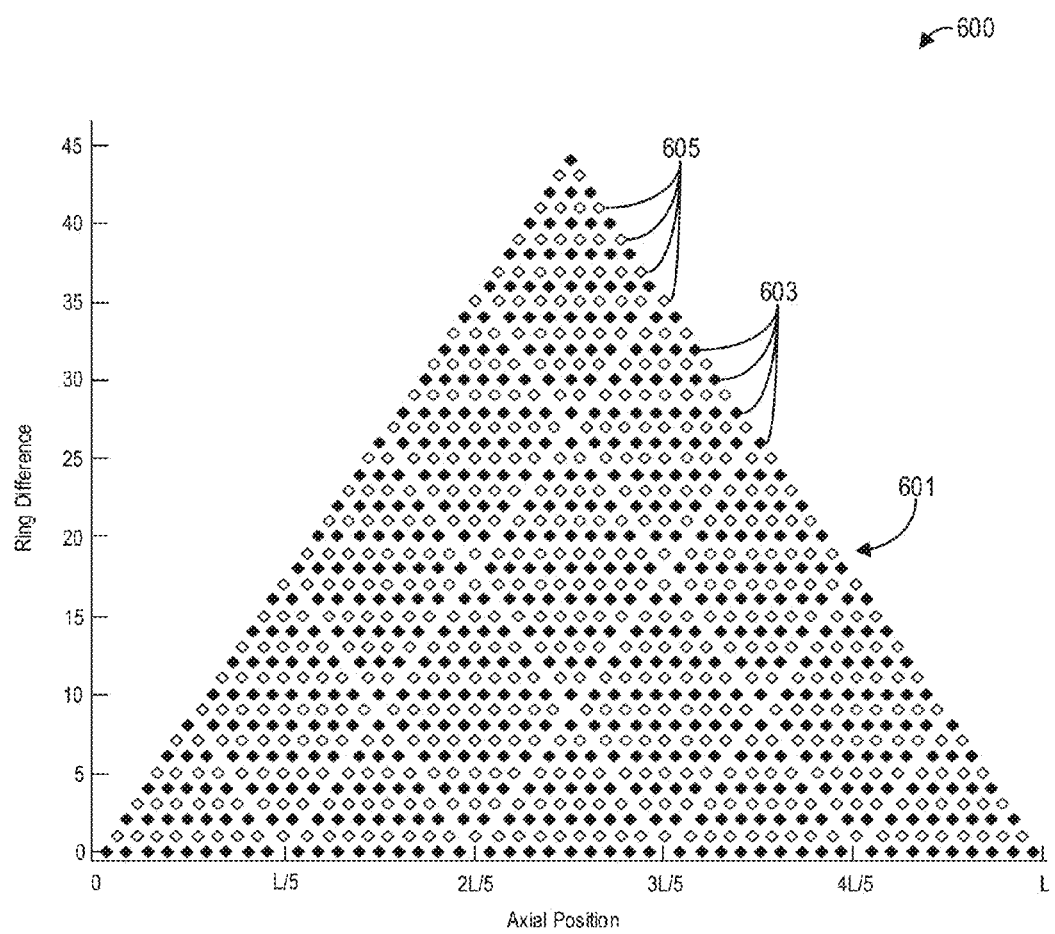
FIG. 6 is a graph illustrating example imaging data.

FIG. 6 is a graph illustrating an example sinogram 600 in terms of ring difference and axial position. In particular, example sinogram 600 is depicted in terms of ring differences as a function of axial position. The sinogram 600 is represented by a plurality of diamonds 601, where each diamond 601 represents a slice of raw imaging data acquired at a particular axial position and ring difference. For example, the imaging data with a ring difference of zero comprises direct LORs that occur between detector crystals within a single detector ring, imaging data with a ring difference of one comprises oblique LORs that occur between detector crystals within adjacent detector rings, imaging data with a ring difference of two comprises oblique LORs that occur between detector crystals within detector rings separated by one detector ring, and so on. Axial position comprises an average of the positions of detector positions. As an illustrative and non-limiting example, for a single LOR, if the first detector hit is at an axial position 100 mm and the second detector hit is at an axial position 50 mm, the LOR has an axial position of 75 mm. In this same example, if the first detector at axial position 100 mm is in the tenth detector ring and the second detector at axial position 50 mm is in the fifth detector ring, then the ring difference of the LOR is 5. Raw imaging data or slices 603 (represented by black diamonds and hereinafter referred to as even slices) comprises LORs with an even-numbered ring difference. Similarly, raw imaging data or slices 605 (represented by white diamonds and hereinafter referred to as odd slices) comprises LORs with an odd-numbered ring difference.

Returning to FIG. 5, after acquiring imaging data, method 500 may continue to 510. At 510, method 500 may optionally include performing segment mashing. Segment mashing comprises a data manipulation technique which may simplify gap compensation in sinograms, wherein raw imaging data structured in terms of ring differences is transformed, or mashed, such that the raw imaging data is structured in terms of segments. A segment comprises a combination of imaging data with even and odd ring differences.

Figure 7:
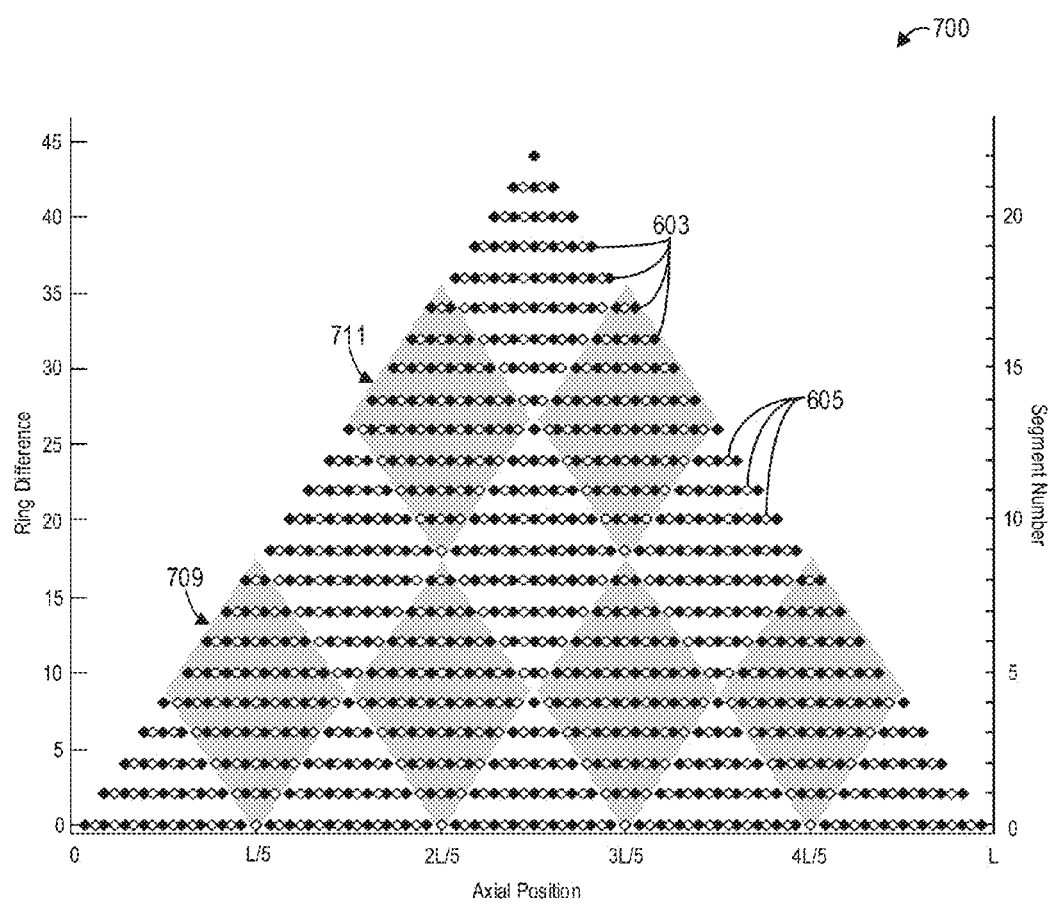
FIG. 7 is a graph illustrating segment mashing of example imaging data according to an embodiment of the invention.

FIG. 7 includes a graph illustrating segment mashing of an example sinogram 700. In particular, the sinogram 700 includes the same imaging data depicted in sinogram 600 after performing segment mashing. Odd slices 605 comprising LORs with odd ring differences are combined with even slices 603 comprising LORs with even ring differences. In particular, odd slices 605 for a given ring difference R are combined with even slices 603 for a ring difference (R−1) into a segment. For example, odd slices 605 of ring difference 1 are combined with even slices 603 of ring difference 0 into segment number 0, odd slices 605 of ring difference 3 are combined with even slices 603 of ring difference 2 into segment number 1, and so on. The shaded regions 709 and 711 of the sinogram 700 indicate groups of imaging data whose physical alignment is affected by the gaps at axial positions L/5, 2L/5, 3L/5, and 4L/5.

Returning to FIG. 5, after optionally performing segment mashing, method 500 may continue to 515. At 515, method 500 may optionally include locating gaps within the sinogram. In some examples, the gap locations may be predetermined based on the detector geometry, for example the gap locations may be associated with the shaded regions 709 and 711 of FIG. 7. However, in examples where the detector geometry is unknown, the gaps may be located by scanning, for example, all sinogram data along all axial positions for each segment or ring difference.

At 520, method 500 may include inserting pseudo-slices into the sinogram. A pseudo-slice comprises a blank, functional slice which effectively functions as a spacer within the sinogram. A pseudo-slice may be inserted into the sinogram at the location of the gaps located at 515.

For example, referring again to FIG. 7, a pseudo-slice may be inserted to each group of imaging data within the shaded regions 709 and 711 for each segment number. For the depicted embodiment, which includes five detector blocks and four gaps, a total of four pseudo-slices are inserted to each of segment numbers 0 through 8, and a total of two pseudo-slices are inserted to each of segment numbers 9 through 17. Zero pseudo-slices are inserted to segment numbers 18 through 22.

Diagram 800 of FIG. 8 illustrates an example insertion of pseudo-slices into imaging data with segment number 0 of sinogram 700. For simplicity, only three detector blocks and two gaps 805 and 806 are depicted. Segment number 0 includes LORs 808 of ring difference 0 and 1 between detectors 802 and 804. Original slices 810 for each LOR 808 may correspond to the slices represented by both the black and white diamonds depicted in FIG. 7. Slice 812 and slice 814, which represent the oblique LORs 808 which cross the gaps 805 and 806 respectively, may correspond to slices in the shaded regions 709 of segment number 0 in FIG. 7. Specifically, slice 812 may correspond to the white diamond of segment number 0 at axial position L/5, while slice 814 may correspond to the white diamond of segment number 0 at axial position 2L/5. Note the irregular spacing of the original slices 810 caused by the gaps 805 and 806 that occurs around slices 812 and 814. The irregular spacing around slices 812 and 814 comprise the gaps in segment number 0 located at step 515.

A pseudo-slice may be inserted into the sinogram data such that slice 812 becomes two slices 822. Similarly, a pseudo-slice may be inserted into the sinogram data such that slice 814 becomes two slices 824. Either slice of slices 822 may comprise the inserted pseudo-slice. In other words, the pseudo-slice may be inserted to the left or to the right of slice 812. Similarly, either slice of slices 824 may comprise the inserted pseudo-slice. Note the uniform spacing of the updated sinogram data 820.

Diagram 900 of FIG. 9 illustrates an example insertion of pseudo-slices into imaging data with segment number 1 of sinogram 700. Again, for simplicity, only three detector blocks including detectors 802 and 804 are depicted along with gaps 805 and 806. Segment number 1 includes LORs 908 of ring difference 2 and 3 between the detectors 802 and 804. Original slices 910 may correspond to the slices represented by both the black and white diamonds in sinogram 700.

Slices 912 and slices 914, which represent the oblique LORs 908 which cross the gaps 805 and 806 respectively, may correspond to slices in the shaded regions 709 of segment number 1 in FIG. 7. Specifically, slices 912 may correspond to the imaging data within the shaded region 709 of segment number 1 about axial position L/5, while slices 914 may correspond to the imaging data within the shaded region 709 of segment number 1 at axial position 2L/5. Note the irregular spacing of the original slices 910 caused by the gaps 805 and 806 that occurs around slices 912 and 914. The irregular spacing around slices 912 and 914 comprise the gaps in segment number 1 located at step 515.

A pseudo-slice may be inserted into the sinogram data 910 such that the four slices 912 become five slices 922. Similarly, a pseudo-slice may be inserted into the sinogram data 910 such that the four slices 914 become five slices 924. Any one slice of slices 922 may comprise the inserted pseudo-slice. In other words, the pseudo-slice may be inserted to the left or to the right of slices 912, or at a point in between one of the slices 912. Similarly, any one slice of slices 924 may comprise the inserted pseudo-slice. Note the uniform spacing of the updated sinogram data 920.

In some examples, the pseudo-slice may be consistently and selectively inserted at a same location with respect to a gap, for example the pseudo-slice may be consistently inserted to the left of the misaligned slices 914. Pseudo-slices may be consistently inserted in this way for each pseudo-slice inserted into the sinogram. In one example, the pseudo-slice may only be inserted to the left of the misaligned slices, such as the slices 914, so that the misaligned slices stay together. In this way, the pseudo-slices inserted into the gaps in the sinogram only partially overlap the gaps in the detector crystal array, or the detector ring assembly. Further, this approach may simplify interpolation between the updated sinogram and the original sinogram.

Though a detector ring assembly with five detector blocks and four gaps is described above, the method may be applied to a detector ring assembly with any number of detector blocks greater than or equal to two. As an example, a detector ring assembly may include four detector blocks with three gaps. For this assembly, three pseudo-slices may be added to each of segments 0 through 8, and one pseudo-slice may be added to each of segments 9 through 17. In another example, a detector ring assembly may include three detector blocks and two gaps. For this assembly, two pseudo-slices may be added to each of segments 0 through 8, and zero pseudo-slices may be added to each of segments 9 through 13.

In this way, a plurality of pseudo-slices may be inserted to a sinogram. Note that the insertion point for each pseudo-slice is not arbitrary, but instead is dependent on the detector geometry. Specifically, each pseudo-slice is inserted in the place of a gap in the raw imaging data. Returning to FIG. 5, after inserting pseudo-slices into the gaps, method 500 may continue to 525. At 525, method 500 may optionally include generating data for each pseudo-slice. In one example, data for each pseudo-slice may be generated via interpolation, for example, by interpolating between the original sinogram (i.e., the sinogram excluding the pseudo-slices) and the updated sinogram (i.e., the sinogram including the pseudo-slices). As another example, generating data for each pseudo-slice may comprise generating data for each pseudo-slice based on at least one slice physically adjacent to the pseudo-slice. For example, data for each pseudo-slice may comprise a weighted combination of data comprising each slice adjacent to the pseudo-slice.

At 530, method 500 may include reconstructing an image from the updated sinogram. The image may be reconstructed from the updated sinogram using an image reconstruction algorithm, including but not limited to analytic reconstruction algorithms (e.g., filtered back projection), iterative reconstruction algorithms, and so on. In some examples, noise and artifact reduction algorithms may be applied to the updated sinogram prior to reconstruction.

At 535, method 500 may include outputting the reconstructed image. For example, the reconstructed image may be output to a display 96 for review by an operator, and additionally or alternatively may be output to memory for later retrieval. Method 500 may then end.

A technical effect of the disclosure may include the insertion of one or more pseudo-slices into a sinogram. Another technical effect of the disclosure may include the generation of a tomographic image with reduced positional errors.

In one embodiment, a method comprises generating a sinogram based on a plurality of photon coincidence events, selectively inserting one or more pseudo-slices into the sinogram, and generating an image based on the sinogram including the one or more pseudo-slices. In one example, selectively inserting the one or more pseudo-slices into the sinogram comprises locating one or more gaps in the sinogram and inserting the one or more pseudo-slices into the one or more gaps. In one example, the one or more gaps in the sinogram correspond to one or more gaps in a detector crystal array, and the one or more pseudo-slices inserted into the one or more gaps in the sinogram only partially overlap the one or more gaps in the detector crystal array.

In one example, the method further comprises generating data for the one or more pseudo-slices based on one or more slices adjacent to the one or more pseudo-slices. In another example, the method further comprises generating data for the one or more pseudo-slices by interpolating between the sinogram and the sinogram including the one or more pseudo-slices.

In one example, generating the image comprises applying an image reconstruction algorithm to the sinogram including the one or more pseudo-slices.

In another example, the method further comprises transforming the sinogram from a first data structure to a second data structure prior to inserting the one or more pseudo-slices. This transformation is referred to hereinabove as segment mashing.

In yet another example, the one or more pseudo-slices comprises a functional, blank slice. The blank pseudo-slice may have the same axial width as other slices in the sinogram.

In one example, the method further comprises outputting the image to a display. In another example, the method further comprises outputting the image to memory for subsequent retrieval. As an example, outputting the image to the display comprises outputting at least an image slice of the image to the display.

In another embodiment, a method comprises: recording a plurality of photon coincidence events; generating a sinogram based on the plurality of photon coincidence events, the sinogram comprising a plurality of slices; compressing the plurality of slices into a plurality of segments; inserting a pseudo-slice within a gap of the plurality of segments to create an updated sinogram; and generating an image based on the updated sinogram.

In one example, the method further comprises generating data for the pseudo-slice based on an interpolation between the sinogram and the updated sinogram. In another example, the method further comprises generating data for the pseudo-slice based on a weighted combination of one or more slices adjacent to the gap.

In one example, the pseudo-slice comprises a functional, blank slice with a same width of each slice of the plurality of slices.

In another example, the method further comprises outputting the image for display on a display device.

In yet another example, the plurality of slices comprises slices of odd ring difference and slices of even ring difference, and compressing the plurality of slices into the plurality of segments comprises combining at least a portion of the slices of odd ring difference and at least a portion of the slices of even ring difference into a segment.

In yet another embodiment, a system comprises: a detector ring assembly comprising a plurality of detector blocks, each detector block including a plurality of detector rings, each detector ring including a plurality of detector elements configured to detect photon coincidence events; a processor; and a memory storing executable instructions that when executed cause the processor to: generate a sinogram based on a plurality of photon coincidence events; selectively insert one or more pseudo-slices into the sinogram; and generate an image based on the sinogram including the one or more pseudo-slices.

In one example, the system further comprises a display device, and the memory stores additional executable instructions that when executed cause the processor to output the image to the display device.

In another example, selectively inserting the one or more pseudo-slices into the sinogram comprises locating one or more gaps in the sinogram and inserting the one or more pseudo-slices into the one or more gaps, wherein the one or more gaps correspond to spaces between the plurality of detector blocks.

In yet another example, the memory stores additional executable instructions that when executed cause the processor to generate data for the one or more pseudo-slices based on one or more slices adjacent to the one or more pseudo-slices.

In another example, the memory stores additional executable instructions that when executed cause the processor to transform the sinogram from a first data structure to a second data structure prior to inserting the one or more pseudo-slices.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
generating, with a processor, a sonogram based on a plurality of photon coincidence events acquired via a detector ring assembly communicatively coupled to the processor;
a step for selectively inserting, with the processor, one or more pseudo-slices into the generated sonogram while adjusting, with the processor, an axial position of one or more slices adjacent to the one or more pseudo-slices, wherein each of the one or more pseudo-slices comprises a blank, functional slice; and
generating, with the processor, an image based on the updated sonogram including the one or more pseudo-slices.

2. The method of claim 1, wherein selectively inserting the one or more pseudo-slices into the generated sinogram comprises locating one or more gaps in the generated sinogram, and inserting the one or more pseudo-slices into the one or more gaps.

3. The method of claim 2, wherein the one or more gaps in the generated sinogram correspond to one or more gaps in a detector crystal array, and wherein the one or more pseudo-slices inserted into the one or more gaps in the generated sinogram only partially overlap the one or more gaps in the detector crystal array.

4. The method of claim 1, further comprising generating data for the one or more pseudo-slices based on one or more slices adjacent to the one or more pseudo-slices.

5. The method of claim 1, further comprising generating data for the one or more pseudo-slices by interpolating between the generated sinogram and the updated sinogram including the one or more pseudo-slices.

6. The method of claim 1, wherein generating the image comprises applying an image reconstruction algorithm to the updated sinogram including the one or more pseudo-slices.

7. The method of claim 1, further comprising transforming the generated sinogram from a first data structure to a second data structure prior to inserting the one or more pseudo-slices.

8. The method of claim 1, further comprising outputting the image to a display.

9. A method, comprising:
recording, with a processor, a plurality of photon coincidence events via a detector ring assembly communicatively coupled to the processor;
generating, with the processor, a sinogram based on the plurality of coincidence events, the sinogram comprising a plurality of slices;

compressing, with the processor, the plurality of slices into a plurality of segments, a step for inserting, with the processor, a pseudo-slice within a gap of the plurality of segments to create an updated sinogram; and generating, with the processor, an image based on the updated sinogram.

10. The method of claim 9, further comprising generating data for the pseudo-slice based on an interpolation between the sinogram and the updated sinogram.

11. The method of claim 9, further comprising generating data for the pseudo-slice based on a weighted combination of one or more slices adjacent to the gap.

12. The method of claim 9, wherein the pseudo-slice comprises a functional, blank slice with a same width of each slice of the plurality of slices.

13. The method of claim 9, further comprising outputting the image for display on a display device communicatively coupled to the processor.

14. The method of claim 9, wherein the plurality of slices comprises slices of odd ring difference and slices of even ring difference, and wherein compressing the plurality of slices into the plurality of segments comprises combining at least a portion of the slices of odd ring difference and at least a portion of the slices of even ring difference into a segment.

15. A system, comprising:
a detector ring assembly comprising a plurality of detector blocks, each detector block including a plurality of detector rings, each detector ring including a plurality of detector elements configured to detect photon coincidence events;
a processor; and
a memory storing executable instructions that when executed cause the processor to:

generate a sinogram based on a plurality of photon coincidence events acquired via the detector ring assembly;

perform a step for selectively inserting one or more pseudo-slices into the sinogram while adjusting an axial position of one or more slices of the sinogram adjacent to the one or more pseudo-slices, wherein each of the one or more pseudo-slices comprises a blank, functional slice; and generate an image based on the sinogram including the one or more psuedo-slices.

16. The system of claim 15, further comprising a display device, and wherein the memory stores additional executable instructions that when executed cause the processor to output the image to the display device.

17. The system of claim 15, wherein selectively inserting the one or more pseudo-slices into the sinogram comprises locating one or more gaps in the sinogram and inserting the one or more pseudo-slices into the one or more gaps, wherein the one or more gaps correspond to spaces between the plurality of detector blocks.

18. The system of claim 15, wherein the memory stores additional executable instructions that when executed cause the processor to generate data for the one or more pseudo-slices based on one or more slices adjacent to the one or more pseudo-slices.

19. The system of claim 15, wherein the memory stores additional executable instructions that when executed cause the processor to transform the sinogram from a first data structure to a second data structure prior to inserting the one or more pseudo-slices.

* * * * *

UNITED STATES PATENT AND TRADEMARK OFFICE
CERTIFICATE OF CORRECTION

PATENT NO. : 9,947,116 B2  
APPLICATION NO. : 14/658066  
DATED : April 17, 2018  
INVENTOR(S) : Christopher Gerald Matthews Page 1 of 1

It is certified that error appears in the above-identified patent and that said Letters Patent is hereby corrected as shown below:

In the Claims

In Claim 1, every instance of the word "sonogram" should instead read "sinogram."

Signed and Sealed this  
Fifth Day of June, 2018

Andrei Iancu  
*Director of the United States Patent and Trademark Office*